United States Patent
Marshall et al.

(10) Patent No.: US 11,989,358 B2
(45) Date of Patent: May 21, 2024

(54) TOUCH-BASED INPUT FOR STYLUS

(71) Applicant: Apple Inc., Cupertino, CA (US)

(72) Inventors: Blake R. Marshall, San Jose, CA (US); Reza Nasiri Mahalati, Belmont, CA (US); Wing Kong Low, Sunnyvale, CA (US); Izhar Bentov, Palo Alto, CA (US); Ashwin Kumar Asoka Kumar Shenoi, Santa Clara, CA (US); Henry N. Tsao, Mountain View, CA (US); Supratik Datta, Sunnyvale, CA (US); Wesley W. Zuber, Mountain View, CA (US); Nandita Venugopal, San Francisco, CA (US); Karan S. Jain, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/729,908

(22) Filed: Apr. 26, 2022

(65) Prior Publication Data

US 2022/0253162 A1     Aug. 11, 2022

Related U.S. Application Data

(63) Continuation of application No. 16/029,489, filed on Jul. 6, 2018, now Pat. No. 11,340,716.

(51) Int. Cl.
*G06F 3/0354*     (2013.01)
*G06F 3/038*     (2013.01)
*G06F 3/044*     (2006.01)

(52) U.S. Cl.
CPC ........ *G06F 3/03545* (2013.01); *G06F 3/0383* (2013.01); *G06F 3/044* (2013.01);
(Continued)

(58) Field of Classification Search
CPC .... G06F 3/03545; G06F 3/0383; G06F 3/044; G06F 2203/04102; G06F 2203/04105;
(Continued)

(56) References Cited

U.S. PATENT DOCUMENTS 9,261,985 B2    2/2016   Hicks
9,389,707 B2    7/2016   Yilmaz et al.
(Continued)

FOREIGN PATENT DOCUMENTS

CN    102609116 A    7/2012
CN    202661977 U    1/2013
(Continued)

OTHER PUBLICATIONS

Korean Office Action from Korean Patent Application No. 10-2022-7023612, dated Aug. 23, 2022, 7 pages including English language translation.

(Continued)

*Primary Examiner* — David Tung
(74) *Attorney, Agent, or Firm* — BAKERHOSTETLER

(57) ABSTRACT

Touch-based input devices, such as a stylus, can receive tactile input from a user. The tactile input functions can be performed by a touch sensor, such as a capacitive sensing device. A touch sensor can be integrated into a stylus in a low profile form. Tactile input can be received at the user's natural grip location. Furthermore, the stylus can effectively distinguish between tactile inputs from a user and disregard sustained tactile inputs that are provided while the user simply holds the stylus at the user's natural grip location.

19 Claims, 11 Drawing Sheets

(52) U.S. Cl.
CPC .............. *G06F 2203/04102* (2013.01); *G06F 2203/04105* (2013.01); *G06F 2203/04107* (2013.01)

(58) Field of Classification Search
CPC ........ G06F 2203/04107; G06F 3/0488; G09G 2203/04102; G09G 2203/04105; G09G 2203/04107
See application file for complete search history.

(56) References Cited

U.S. PATENT DOCUMENTS

| | | | |
|---|---|---|---|
| 2005/0180618 | A1 | 8/2005 | Black |
| 2008/0067526 | A1 | 3/2008 | Chew |
| 2009/0073144 | A1* | 3/2009 | Chen ................... G06F 3/03545 345/179 |
| 2012/0206330 | A1* | 8/2012 | Cao ....................... G06F 3/0346 345/156 |
| 2013/0106766 | A1 | 5/2013 | Yilmaz et al. |
| 2014/0078117 | A1* | 3/2014 | Asano .................... G09B 11/00 345/179 |
| 2014/0253463 | A1 | 9/2014 | Hicks |
| 2014/0253464 | A1* | 9/2014 | Hicks .................... G06F 3/0488 345/173 |
| 2014/0267184 | A1* | 9/2014 | Bathiche ............... G06F 1/3259 345/179 |
| 2015/0212578 | A1 | 7/2015 | Lor et al. |
| 2016/0062490 | A1 | 3/2016 | Ogata |
| 2016/0139690 | A1 | 5/2016 | Chang |
| 2016/0162045 | A1* | 6/2016 | Vincent ............... G06F 3/03545 345/179 |
| 2016/0282970 | A1 | 9/2016 | Evreinov et al. |
| 2017/0068340 | A1 | 3/2017 | Zimmerman et al. |
| 2017/0322645 | A1 | 11/2017 | Kao |
| 2018/0024650 | A1 | 1/2018 | Hou et al. |
| 2019/0113986 | A1* | 4/2019 | Bikumala ................ G06F 3/017 |
| 2019/0302908 | A1* | 10/2019 | Wu ....................... G06F 3/0346 |

FOREIGN PATENT DOCUMENTS

| | | |
|---|---|---|
| CN | 105474147 | 4/2016 |
| CN | 105718079 | 6/2016 |
| CN | 105960626 | 9/2016 |
| JP | H 03-166617 | 7/1991 |
| JP | H 06-065929 U | 9/1994 |
| JP | 2010-238046 | 10/2010 |
| JP | 2017-518572 | 7/2016 |
| JP | 2016-186696 | 10/2016 |
| KR | 10-2010-0107996 | 10/2010 |
| KR | 10-2018-0029266 | 3/2018 |
| WO | WO 2016/006426 | 1/2016 |

OTHER PUBLICATIONS

Invitation to Pay Additional Fees from PCT/US2018/065549, dated Mar. 14, 2019, 14 pages.
International Search Report and Written Opinion from PCT/US2018/065549, dated May 7, 2019, 19 pages.
Japanese Office Action from Japanese Patent Application No. 2021-500108, dated Jan. 5, 2022, 5 pages including English language translation.
Korean Office Action from Korean Patent Application No. 10-2021-7001362, dated Dec. 17, 2021, 13 pages including English language translation.
Korean Notice of Allowance from Korean Patent Application No. 10-2021-7001362, dated Apr. 15, 2022, 5 pages including English language translation.
Chinese Office Action from Chinese Patent Application No. 201910139482.1, dated Nov. 17, 2022, 28 pages including English language translation.
Korean Notice of Allowance from Korean Patent Application No. 10-2022-7023612, dated Dec. 23, 2022, 8 pages including English language translation.
Japanese Office Action from Japanese Patent Application No. 2022-070550, dated Apr. 20, 2023, 5 pages including English language translation.
German Office Action from German Patent Application No. 11 2018 007 812.4, dated Jun. 29, 2023, 11 pages including machine-generated English language translation.
Chinese Office Action from Chinese Patent Application No. 201910139482.1, dated Jun. 16, 2023, 13 pages including English language translation.
Chinese Office Action from Chinese Patent Application No. 201880095416.2, dated Sep. 15, 2023, 15 pages including English language translation.
Chinese Office Action from Chinese Patent Application No. 201910139482.1, dated Sep. 28, 2023, 9 pages including English language summary.
Japanese Office Action from Japanese Patent Application No. 2022-070550, dated Oct. 5, 2023, 5 pages including English language translation.
Japanese Notice of Allowance from Japanese Patent Application No. 2022-070550, dated Feb. 6, 2024, 4 pages including machine-generated English language translation.
German Office Action from German Patent Application No. 11 2018 007 812.4, dated Jan. 17, 2024, 10 pages including English language translation.

\* cited by examiner

TOUCH-BASED INPUT FOR STYLUS

CROSS RELATED REFERENCE TO RELATED APPLICATIONS

This application is a continuation of U.S. patent application Ser. No. 16/029,489, entitled "TOUCH-BASED INPUT FOR STYLUS," filed on Jul. 6, 2018, the disclosure of which is hereby incorporated herein in its entirety.

TECHNICAL FIELD

The present description relates generally to touch-based input devices, and, more particularly, to touch-based input for a stylus.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

Furthermore, while the user is holding a stylus or other touch-based input device, the user may be limited to the input options provided thereby. Accordingly, additional input capabilities that are integrated into the input device would provide the user with expanded input capabilities without the need to simultaneously operate additional input devices. Some existing styluses or other touch-based input devices may require a user to operate input components that are at a location other than the user's natural grip location, thereby requiring that the user adjust the grip to provide the desired input.

In accordance with embodiments disclosed herein, improved touch-based input devices can receive tactile input from a user. The tactile input functions can be performed by a touch sensor, such as a capacitive sensing device. A touch sensor can be integrated into an input device in a low profile form. Tactile input can be received at the user's natural grip location. Furthermore, the stylus can effectively distinguish between tactile inputs from a user and disregard sustained tactile inputs that are provided while the user simply holds the stylus at the user's natural grip location.

Figure 1:
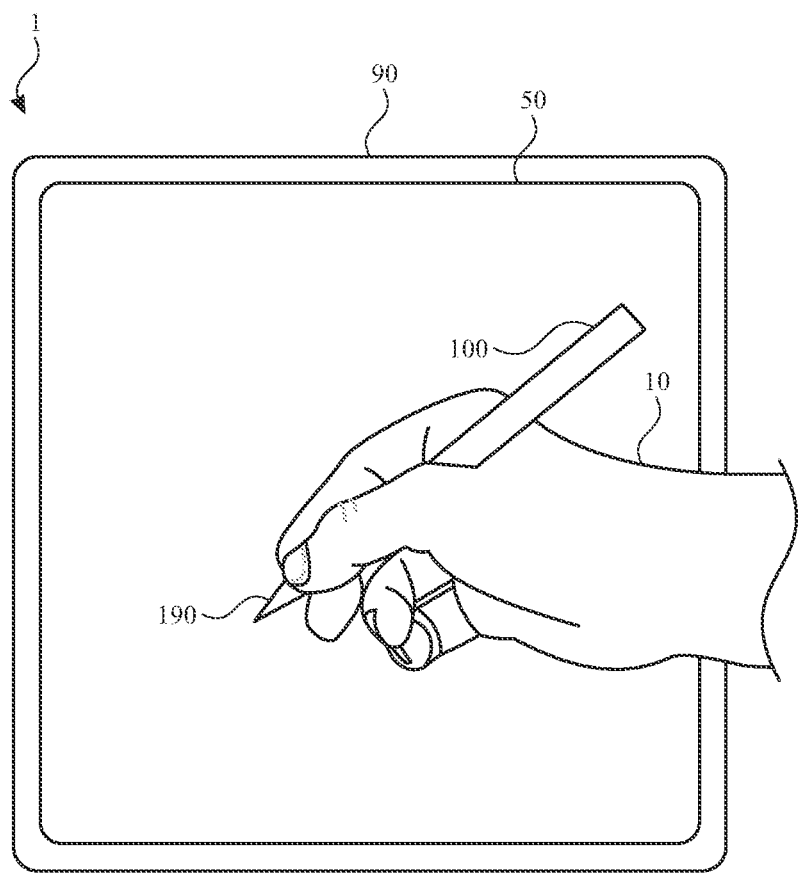
FIG. 1 illustrates a view of a system including a stylus and an external device, according to some embodiments of the subject technology.

A touch-based input device in accordance with embodiments disclosed herein can include any device that is held, worn, or contacted by a user for providing input and/or receiving feedback. The touch-based input device can be used alone or in conjunction with another device. For example, FIG. 1 illustrates a system 1 including a stylus 100 and an external device 90 having a surface 50, according to some embodiments of the subject technology. The stylus 100 can be held by a user 10 and operate as a touch-based input device for use with the external device 90.

The surface 50 of the external device 90 can include a display surface and/or a touch panel for interacting with the stylus 100 when contacted thereby. The external device 90 utilizes the display to render images to convey information to the user. The display can be configured to show text, colors, line drawings, photographs, animations, video, and the like. The surface 50 of the external device 90 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

The stylus 100 can include a tip 190 for contacting the surface 50. Such contact can be detected by the external device 90 and/or the stylus 100. For example, the stylus 100 can include one or more sensors that detect when the tip 190 contacts and applied pressure to the surface 50. Such sensors can include one or more contact sensors, capacitive sensors, touch sensors, cameras, piezoelectric sensors, pressure sensors, proximity sensors, electric field sensors, photodiodes, and/or other sensors operable to detect contact with the surface 50. Such sensors can optionally operate cooperatively with the external device 90 to detect contact with the surface 50.

Figure 2:
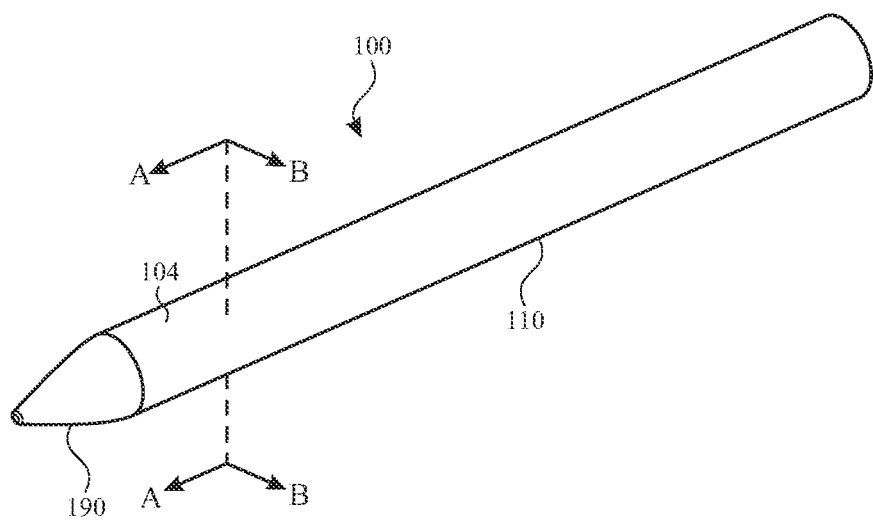
FIG. 2 illustrates a perspective view of the stylus of FIG. 1, according to some embodiments of the subject technology.

The stylus 100 can support handling and operation by a user. In particular, the stylus 100 can receive inputs from a user at a location of the user's grip. FIG. 2 illustrates a stylus 100, according to some embodiments of the subject technology. According to some embodiments, for example as illustrated in FIG. 2, the stylus 100 can include a housing 110 that provides an outermost cover along at least a portion of the length of the stylus 100. A user can grip the stylus 100 at a user grip region 104 during use of the stylus 100. The user grip region 104 can be located at a natural grip location, so that the user can provide inputs at the same location that is grasped during normal use of the stylus 100. For example, the user grip region 104 can be located an outer surface of the housing 110. The user grip region 104 can be near the tip 190 of the stylus 100. For example, the location of the user grip region 104 can be a distance from the tip 190 that is less than a half, a third, or a quarter of the total length of the stylus 100. At the user grip region 104, components of the stylus 100 can be positioned to receive tactile input from the user. For example, the user grip region 104 can be a portion of the housing 110. Alternatively or in combination, the user grip region 104 can include an input component 102 set within the housing 110, such as a button, switch, knob, lever, and/or another input component 102. According to some embodiments, a marker can be provided on the outer surface 112 as an indicator for the location of the user grip region 104. The marker can be flush with neighboring portions of the outer surface, such that it can be seen but provide the same tactile features as other portions of the housing 110. Alternatively or in combination, the marker can provide a protrusion, recess, or texture that provides surface features that are different from adjacent portions of the housing 110.

The stylus 100 can include a touch sensor 200 within the housing 110. The touch sensor 200 can be a capacitive touch sensor that extends along at least a portion of a length of the stylus 100.

Figure 3:
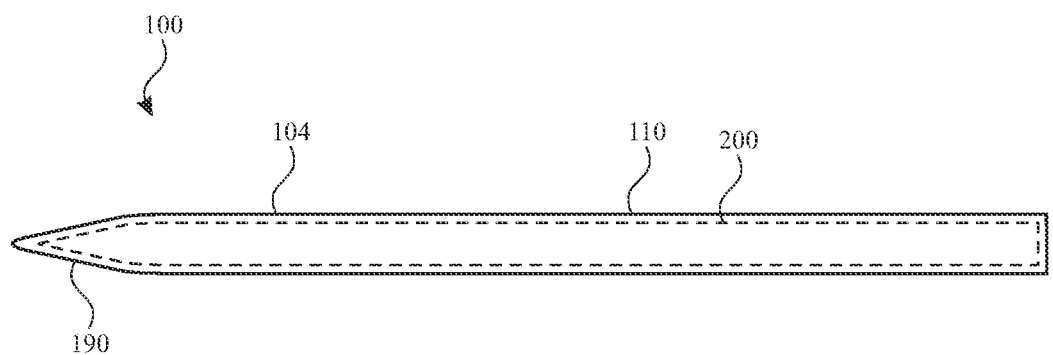
FIG. 3 illustrates a side view of a stylus, according to some embodiments of the subject technology.

As shown in FIG. 3, the touch sensor 200 can extend at least partially within a grip region 104 of the stylus 100. Additionally or alternatively, the touch sensor 200 can extend to and/or at least partially within a tip 190 of the stylus 100. Additionally or alternatively, the touch sensor 200 can extend to an end of the stylus 100 that is opposite the tip 190. The touch sensor 200 can be used to detect contact with or proximity of a finger of the user. Additionally or alternatively, the touch sensor 200 can be used to detect contact with or proximity of another object, such as a surface to which the stylus is applied.

Figure 4:
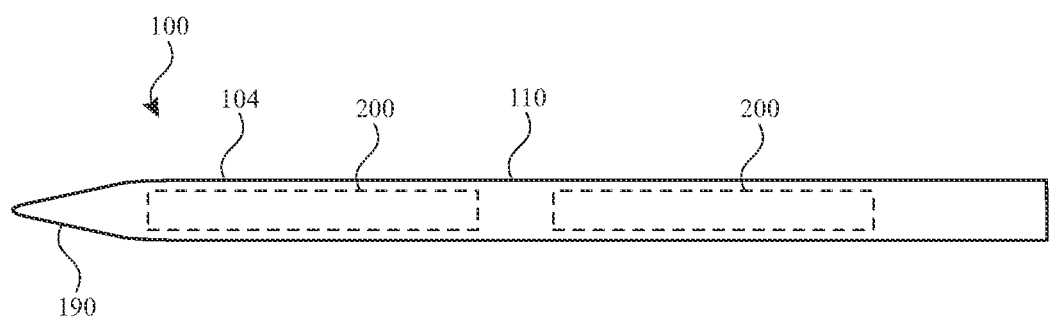
FIG. 4 illustrates a side view of a stylus, according to some embodiments of the subject technology.

As shown in FIG. 4, the stylus 100 can include multiple touch sensors 200. Each of the multiple touch sensors 200 can extend within a different portion of the housing 110. The touch sensors 200 can be spaced apart from each other. At least one of the touch sensors 200 can extend along the grip region 104. Gestures detected by the separate touch sensors 200 can be interpreted as different user inputs according to preprogrammed functions to be performed by the stylus 100 and/or an external device upon detection of the user gestures.

Figure 5:
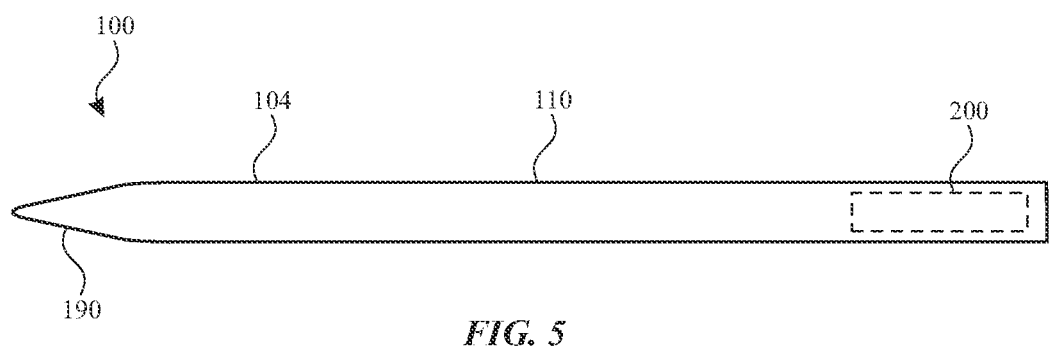
FIG. 5 illustrates a side view of a stylus, according to some embodiments of the subject technology.

As shown in FIG. 5, a touch sensor 200 can be positioned at an end of the stylus 100 that is opposite the tip 190. Gestures detected at an end of the stylus 100 can be interpreted differently than gestures provided at other locations, such as the grip region. For example, gestures at an end of the stylus 100 can perform functions (e.g., drawing, erasing, etc.) that are not performed when gestures are received at the grip region.

The touch sensor 200 can be used to cause the stylus and/or the external device to perform one or more functions. While certain examples are provided herein, it will be appreciated that any function of the stylus and/or the external device can be performed according to preprogrammed features of the stylus and/or the external device.

The touch sensor 200 can be used to detect where and whether the user is gripping the stylus 100. The stylus 100 can then enter an idle mode or wake mode based on the grip detection. Additionally or alternatively, the external device can then enter an idle mode or wake mode based on grip detection at the stylus.

Figure 6:
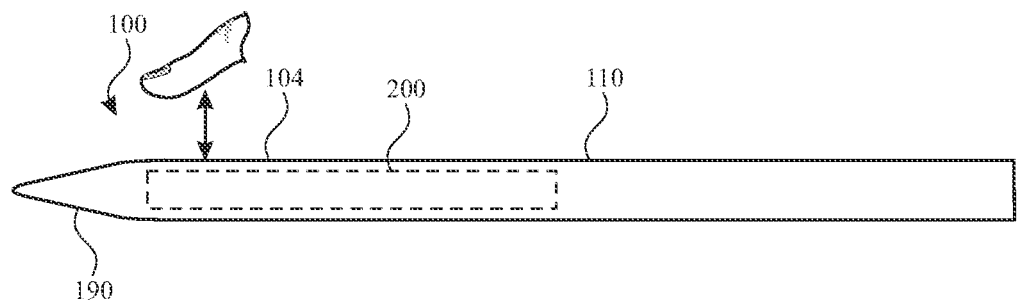
FIG. 6 illustrates a side view of a stylus, according to some embodiments of the subject technology.

The touch sensor 200 can be used to change, select, and/or display one or more settings of the stylus and/or the external device. For example, the touch sensor 200 can detect gestures and transmit a signal to the external device to change, select, and/or display one or more settings that affect performance of the stylus and/or the external device. The setting can relate to a characteristic (e.g., color, size, width, thickness, shape, etc.) of a marking produced by use of the stylus with the external device As shown in FIG. 6, the touch sensor 200 can be used to detect a tap, double tap, triple tap, or another tap gesture by the user. For example, as a user applies a finger at the grip region 104, the stylus 100 can detect the resulting capacitance that is induced in the touch sensor 200. The user can subsequently lift the finger, and the stylus 100 can detect the resulting capacitance or change in capacitance that is induced in the touch sensor 200. The user can subsequently return the finger to the grip region 104, and the stylus 100 can detect the resulting capacitance or change in capacitance that is induced in the touch sensor 200. The sequence of inputs within a span of time can be interpreted by the stylus 100 as a user's tap gesture. Detected tap gestures can be correlated with preprogrammed functions to be performed by the stylus 100 and/or an external device upon detection of the tap gestures. For example, one or more taps can be interpreted as a user input to change a characteristic (e.g., color, size, width, thickness, shape, etc.) of a marking produced by use of the stylus with the external device. By further example, one or more taps can be interpreted as a user input to perform functions on the external device, such as a copy function, a paste function, an undo function, and/or a redo function. By further example, one or more taps can be interpreted as a user input to change a tool (e.g., drawing, erasing, etc.) setting for generating markings on the external device.

Figure 7:
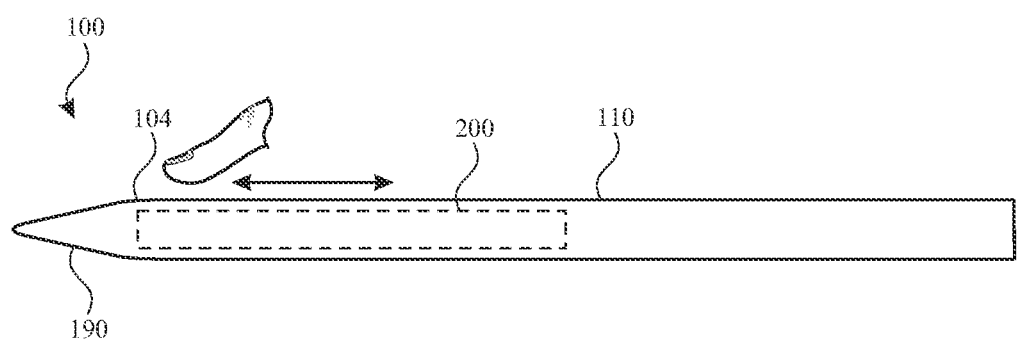
FIG. 7 illustrates a side view of a stylus, according to some embodiments of the subject technology.

As shown in FIG. 7, the touch sensor 200 can be used to detect a sliding gesture by the user. Multiple sensing elements of the touch sensor 200 along the grip region can be used in concert to detect particular user inputs. For example, as a user applies a finger at a first part of the grip region, the touch sensor 200 of the stylus 100 can detect the resulting capacitance that is induced in a corresponding first sensing element of the touch sensor 200. The user can subsequently move the finger to a second part of the grip region 104, and the touch sensor 200 of the stylus 100 can detect the resulting capacitance that is induced in the corresponding second sensing element of the touch sensor 200. For longitudinal sliding gestures, the corresponding sensing elements can be those that are distributed longitudinally within the housing 110. The sequence of inputs within a span of time can be interpreted by the stylus 100 as a user's motion gesture in a particular direction (e.g., in a longitudinal direction along a line or path defined by the longitudinal distribution of the sensing elements). For example, the sequence of (1) a detected capacitance in the first sensing element and then (2) a detected capacitance and the second sensing element can be interpreted as a user motion gesture in a first direction. The sequence of (1) a detected capacitance and the second sensing element and then (2) a detected capacitance in the first sensing element can be interpreted as a user motion gesture in a second direction, opposite the first direction. Detected sliding gestures can be correlated with preprogrammed functions to be performed by the stylus 100 and/or an external device upon detection of the sliding gestures. For example, longitudinal or other sliding gestures can be interpreted as a user input to change a characteristic (e.g., color, size, width, thickness, shape, etc.) of a marking produced by use of the stylus with the external device. By further example, longitudinal or other sliding gestures can be interpreted as a user input to perform functions on the external device, such as a copy function, a paste function, an undo function, and/or a redo function.

Figure 8:
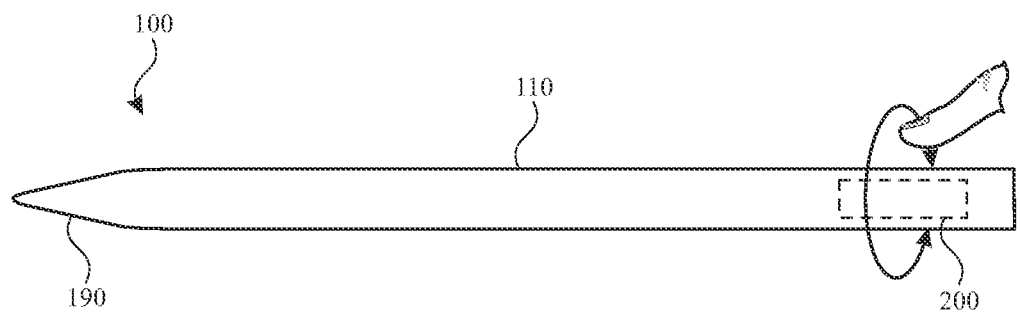
FIG. 8 illustrates a side view of a stylus, according to some embodiments of the subject technology.

As shown in FIG. 8, the touch sensor 200 can be used to detect a rolling gesture by the user. The rolling gesture can include movement of a finger about a circumference of the housing 110 and/or rolling movement of the housing 110 over a surface, such as a working surface. Multiple sensing elements of the touch sensor 200 distributed circumferentially within the housing 110 can be used in concert to detect particular user inputs. For example, as a user applies a finger or another surface at a first part of the housing 110, the touch sensor 200 of the stylus 100 can detect the resulting capacitance that is induced in a corresponding first sensing element of the touch sensor 200. The user can subsequently move the finger or other surface to a second part of the grip region 104, and the touch sensor 200 of the stylus 100 can detect the resulting capacitance that is induced in the corresponding second sensing element of the touch sensor 200. For rolling gestures, the corresponding sensing elements can be those that are distributed circumferentially within the housing 110. The sequence of inputs within a span of time can be interpreted by the stylus 100 as a user's motion gesture in a particular direction (e.g., in a circumferential direction along a line or path defined by the circumferential distribution of the sensing elements). Detected rotational gestures can be correlated with preprogrammed functions to be performed by the stylus 100 and/or an external device upon detection of the rotational gestures. For example, rotational gestures can be interpreted as a user input to change a characteristic (e.g., color, size, width, thickness, shape, etc.) of a marking produced by use of the stylus with the external device. By further example, rotational gestures can be interpreted as a user input to change a tool (e.g., drawing, erasing, etc.) setting for generating markings on the external device. By further example, rotational gestures can be interpreted as a user input to perform functions on the external device, such as zooming in or out of a displayed view and/or scaling the size or other aspect of an object displayed on the external device.

It will be appreciated that the touch sensor 200 can be used to detect combinations of gestures, including tap gestures, sliding gestures, rotational gestures, and/or other gestures. For example a sequence of different gestures in combination can be interpreted by the stylus 100 as a user's input.

Figure 9:
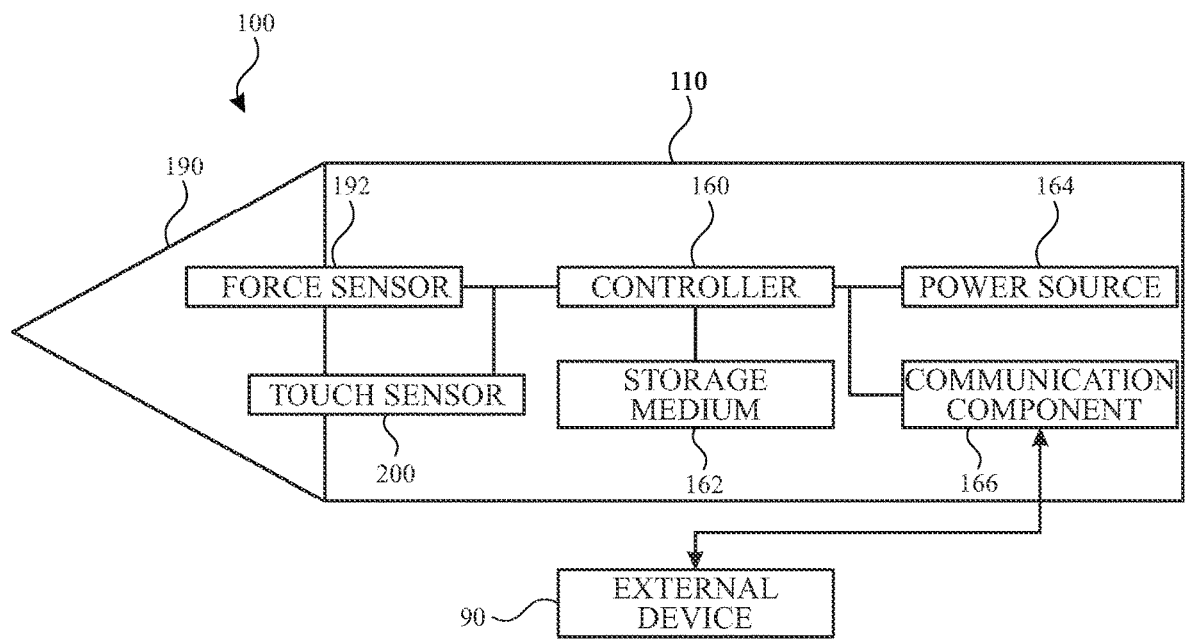
FIG. 9 illustrates a block diagram illustrating the stylus and the external device of FIG. 1, according to some embodiments of the subject technology.

As shown in FIG. 9, the stylus 100 can include components that support handling and operation by a user. Inputs can be provided by a user at one or more components of the stylus 100.

A force sensor 192 can be operated to detect user inputs at the tip 190 of the stylus 100. The force sensor 192 can interact with both the tip 190 and the housing 110 to detect relative motion of the tip 190 and the housing 110. For example, the force sensor 192 can be operated to detect when the tip 190 is contacting a surface, such as the surface of the external device 90. The detection can be based on movement of the tip 190 relative to the housing 110. Accordingly, the force sensor 192 can be directly or indirectly connected to both the tip 190 and the housing 110 to detect relative motion there between. The force sensor 192 can include a component that converts mechanical motion of the tip 190 into an electric signal. The force sensor 192 can include one or more contact sensors, capacitive sensors, touch sensors, strain gauges, cameras, piezoelectric sensors, pressure sensors, photodiodes, and/or other sensors. The force sensor 192 can detect both the presence and magnitude of a force.

In use, a user may manipulate the stylus 100 and apply a force to a surface of the external device 90. A corresponding reaction force may be transferred through the tip 190 of the stylus 100 connected to an electromechanical coupling and to the force sensor 192 of the stylus 100. The force sensor 192, or a portion thereof, may deform in response which may be measured and used to estimate the applied force. The force sensor 192 can be used to produce a non-binary output that corresponds to the applied force. For example, the force sensor 192 can be used to produce an output that represents a magnitude that varies in accordance with a variable amount of applied force.

A touch sensor 200 can be provided to detect contact by a user on a grip region of the housing 110 of the stylus 100. The touch sensor 200 can include a capacitive touch sensor, such as a self-capacitance sensor. As described further herein, the touch sensor 200 can include multiple sensing elements, such as conductive electrodes, to detect contact and changes in contact at multiple locations.

As further shown in FIG. 9, the stylus 100 can include a controller 160 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 160 can execute one or more instructions stored in the non-transitory storage medium 162 to perform one or more functions.

As further shown in FIG. 9, the stylus 100 can include a power source 164, such as one or more batteries and/or power management units. The stylus 100 can include components for charging the power source 164.

As further shown in FIG. 9, the stylus 100 can include a communication component 166 for communicating with the external device 90 and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90 and/or another device.

The stylus 100 can include other components including, but not limited to, displays, sensors, switches (e.g., dome switches), buttons, voice coils, and/or other components. The stylus 100 can detect environmental conditions and/or other aspects of the operating environment of the stylus 100 with an environmental sensor such as an ambient light sensor, proximity sensor, temperature sensor, barometric pressure sensor, moisture sensor, and the like. The stylus 100 can include a haptic feedback component that provides haptic feedback with tactile sensations to the user. The haptic feedback component can be implemented as any suitable device configured to provide force feedback, vibratory feedback, tactile sensations, and the like. For example, in one embodiment, the haptic feedback component may be implemented as a linear actuator configured to provide a punctuated haptic feedback, such as a tap or a knock. The stylus 100 can detect motion characteristics of the stylus 100 with a motion sensor such as an accelerometer, a gyroscope, a global positioning sensor, a tilt sensor, and so on for detecting movement and acceleration of the stylus 100. The stylus 100 can detect biological characteristics of the user manipulating the stylus with a biosensor that detects skin temperature, heart rate, respiration rate, blood oxygenation level, blood volume estimates, blood pressure, or a combination thereof. The stylus 100 can quantify or estimate a property of an object nearby or otherwise external to the stylus 100 with a utility sensor such as magnetic field sensors, electric field sensors, color meters, acoustic impedance sensors, pH level sensor, material detection sensor, and so on. Such data may be used to adjust or update the operation of the stylus 100 and/or may communicate such data to the external device 90 to adjust or update the operation thereof.

The external device 90 can also include components that facilitate operation of the stylus 100. For example, the external device 90 can include one or more of a processor, a memory, a power supply, one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on. In some embodiments, a communication interface of the external device 90 facilitates electronic communications between the external device 90 and the stylus 100.

Figure 10:
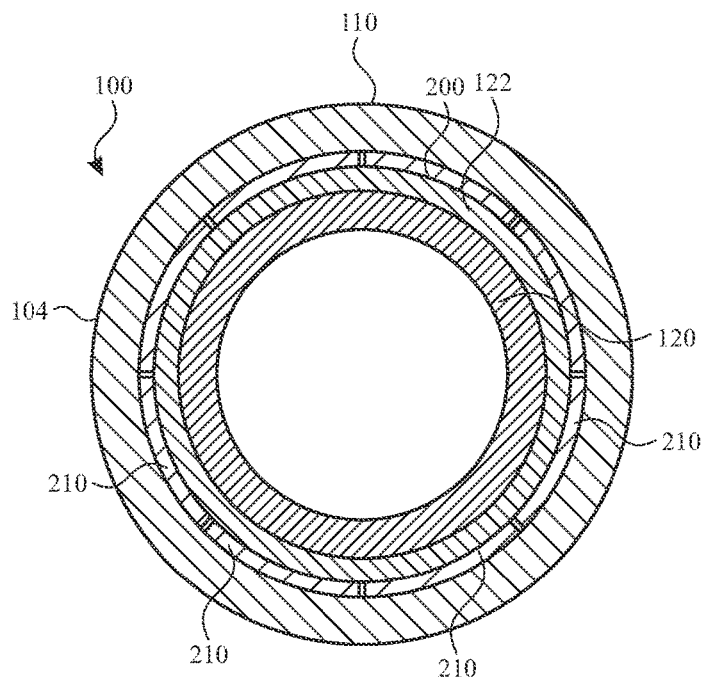
FIG. 10 illustrates a front sectional view of the section A-A of the stylus of FIG. 2, according to some embodiments of the subject technology.

The stylus 100 can receive tactile input from the user at the user grip region 104 with a touch sensor 200. FIG. 10 illustrates a front sectional views of the stylus 100, according to some embodiments of the subject technology. The touch sensor 200 can be positioned radially between a support member 120 and the housing 110 of the stylus 100. In addition, an elastic insert 122 can be positioned between the touch sensor 200 and the support member 120. With the elastic insert 122 positioned radially between the support member 120 and the touch sensor 200, the elastic insert 122 can bias the touch sensor 200 radially outwardly against the housing 110.

The touch sensor 200 can include multiple sensing elements 210 distributed circumferentially. For example, the sensing elements 210 shown in FIG. 10 are distributed circumferentially so that each sensing element 210 of a given row faces radially outwardly at a different portion of the housing 110. The touch sensor 200 can include 1, 2, 3, 4, 5, 6, 7, 8, 9, 10, or more than 10 sensing elements 210 about a circumference. The distribution of sensing elements 210 provides independent sensing capabilities at multiple locations about the circumference of the stylus 100 at the grip region 104.

The housing 110 can have one of a variety of cross-sectional shapes and sizes. Where the housing 110 in FIG. 10 has a round outer and inner cross-sectional shape to provide a generally cylindrical shape, it will be understood that the housing 110 can have outer and/or inner cross-sectional shapes that different from the round shapes of FIG. 10.

Figure 11:
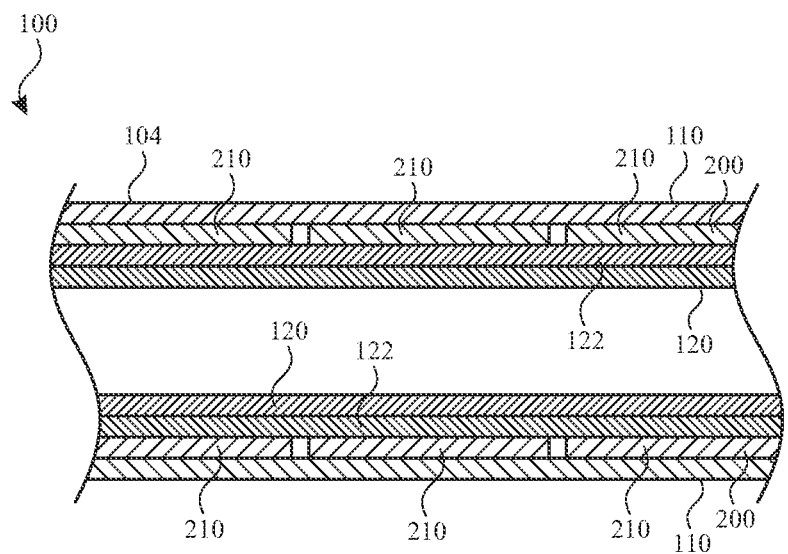
FIG. 11 illustrates a side sectional view of the section B-B of the stylus of FIG. 2, according to some embodiments of the subject technology.

As shown in FIG. 11, the touch sensor 200 can include multiple sensing elements 210 distributed along a longitudinal length of the stylus 100 at the grip region 104. For example, the sensing elements 210 shown in FIG. 11 are distributed longitudinally so that each sensing element 210 of a given column faces outwardly at a different portion of the housing 110. The touch sensor 200 can include 1, 2, 3, 4, 5, 6, 7, 8, 9, 10, or more than 10 sensing elements 210 along a longitudinal length. The distribution of sensing elements 210 provides independent sensing capabilities at multiple locations along the longitudinal length of the stylus 100 at the grip region 104.

The touch sensor 200 can receive and detect tactile input from a user. According to some embodiments, the user input can indicate a selection made by the user and transmitted to the external device. According to some embodiments, the user input can indicate that the external device is to perform a corresponding action in response to subsequent inputs from the stylus 100. For example, the stylus 100 can be used to indicate markings when used on a surface of the external device 90, and the user input can indicate a selection of marking characteristics, such as shape, thickness, and color. According to some embodiments, the user input can select or alter a setting of the external device 90, such as a selection between markings (e.g., drawing mode) or erasing existing markings (e.g., eraser mode).

The touch sensor 200 can be positioned along at least a portion of the stylus 100. The touch sensor 200 can be positioned at a grip region 104 of the stylus 100. Accordingly, the touch sensor 200 can be used to detect inputs provided by a user at the grip region 104 while the stylus 100 is being gripped and/or held by a user. The touch sensor 200 can be used to distinguish between the grip of the user and intentional inputs from the user, as discussed further herein.

Figure 12:
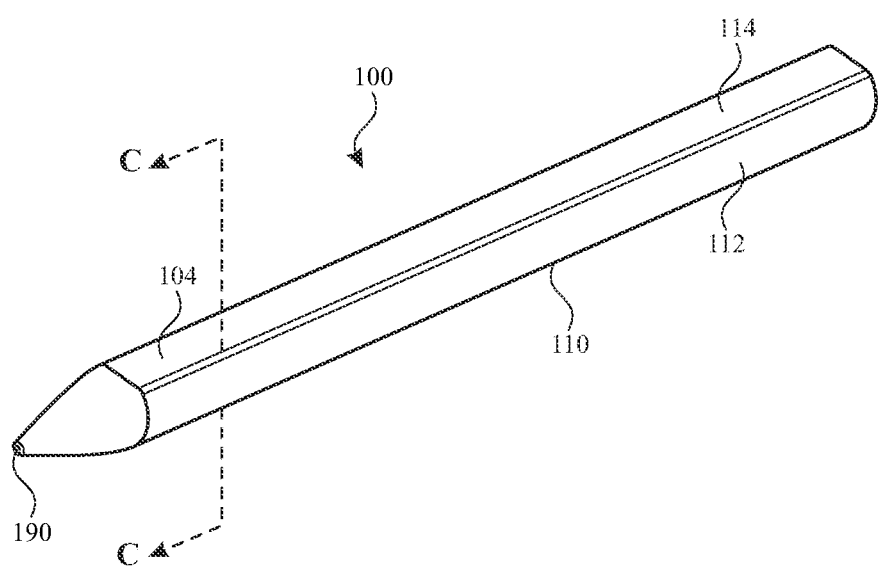
FIG. 12 illustrates a perspective view of a stylus, according to some embodiments of the subject technology.
Figure 13:
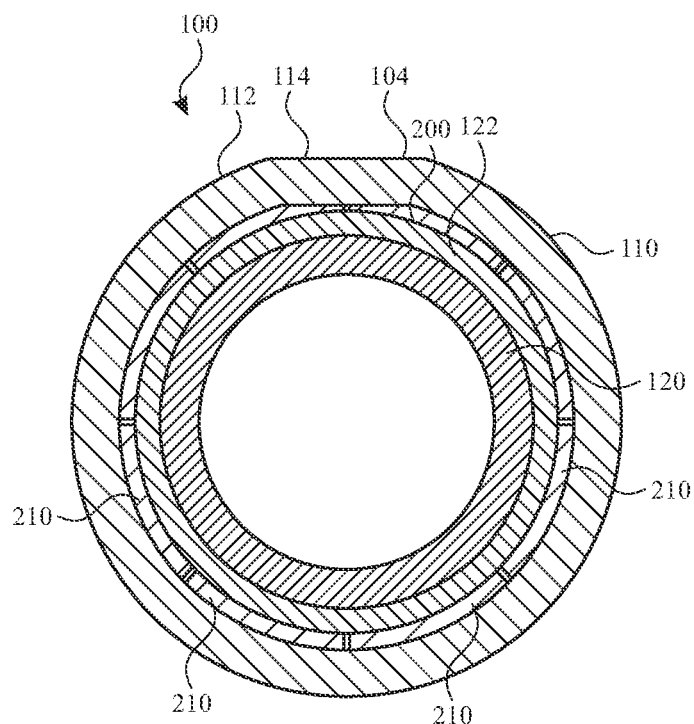
FIG. 13 illustrates a front sectional view of the section C-C of the stylus of FIG. 12, according to some embodiments of the subject technology.

The housing of the stylus can have one or more of a variety of shapes. FIG. 12 illustrates a stylus 100 with a housing 110 having a non-circular cross-sectional shape. The housing 110 provides an outermost cover along at least a portion of the length of the stylus 100, including the user grip region 104. As shown in FIGS. 12 and 13, the housing 110 can include a curved portion 112 and a flat portion 114. The flat portion 114 can be used to stabilize the stylus 100 against another surface, such as a working surface, an electronic device, and/or a charging station.

As shown in FIG. 13, the housing 110 can be curved along some or all of an inner and/or outer surface. The housing 110 can be flat along some or all of an inner and/or outer surface. The touch sensor 200 can generally conform to the outer shape of the support member 120 and/or the elastic insert 122. Additionally or alternatively, the touch sensor 200 can generally conform to the inner shape of the housing 110, which may include flat and/or curved surfaces. Where the touch sensor 200 does not directly contact the inner surface of the housing 110, the touch sensor 200 can maintain a constant distance with respect to the housing 110, so that the presence of a finger on the housing 110 is reliably detectable by the touch sensor 200.

Figure 14:
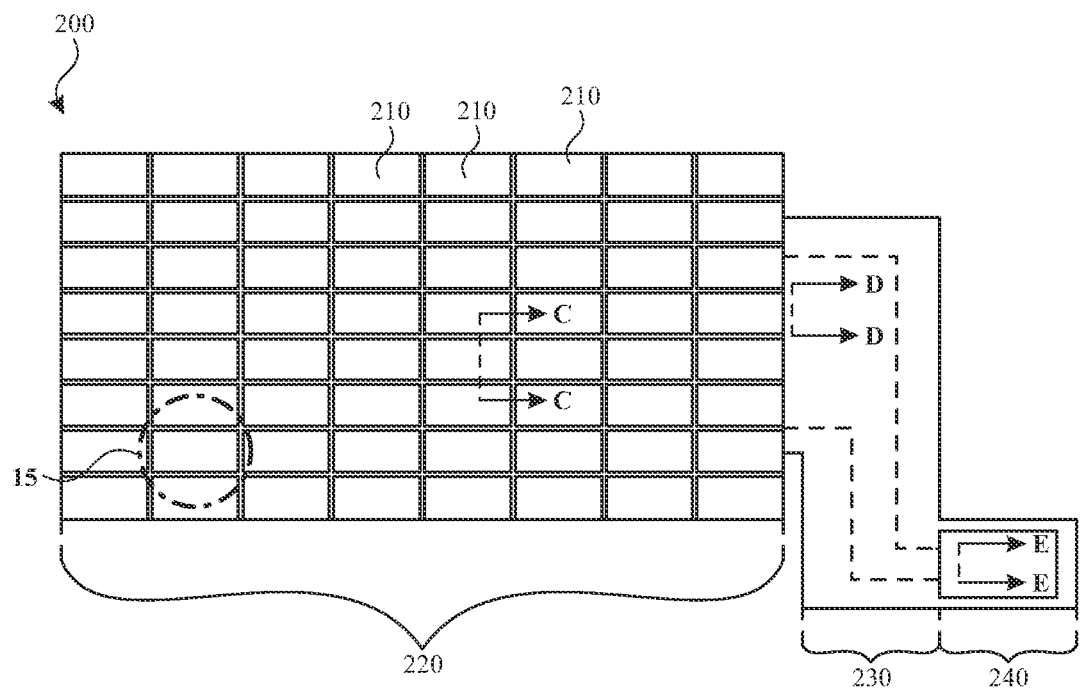
FIG. 14 illustrates a top view of a touch sensor, according to some embodiments of the subject technology.

The touch sensor 200 can be provided initially as a sheet or substantially flat article that is flexible and bendable. As shown in FIG. 14, the touch sensor 200 can include multiple sensing elements 210 along a sensing region 220 of the touch sensor 200. The sensing elements 210 can be arranged in a pattern or grid that includes multiple rows and/or columns.

The sensing region 220 of the touch sensor 200 can be connected to an interface region 240 by a connector region 230. The interface region 240 can provide one or more electrical terminals for contacting a controller of the stylus when connected to an interface of the controller.

Figure 15:
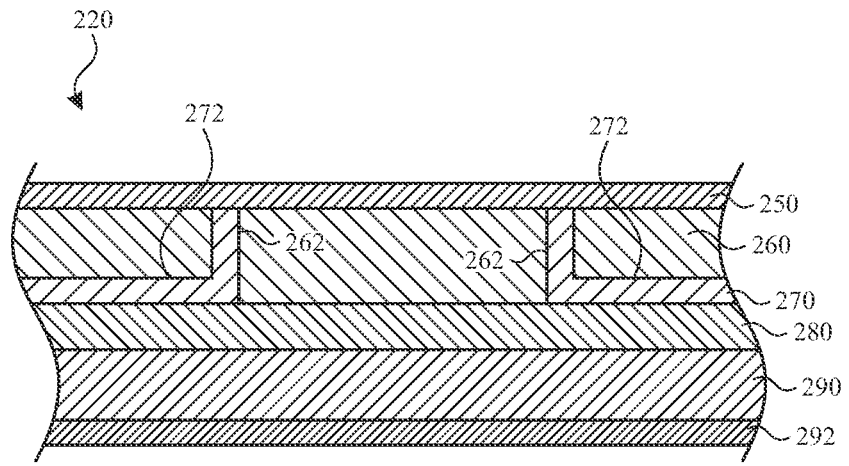
FIG. 15 illustrates a sectional view of the section C-C of the touch sensor of FIG. 14, according to some embodiments of the subject technology.

As shown in FIG. 15, the sensing region 220 of the touch sensor can include multiple layers that provide sensing capabilities. At a surface of the sensing region 220, a sensor layer 250 can be positioned to detect user inputs. The sensor layer 250 can include one or more conductive portions defining sensing elements and/or grounded regions for detecting capacitance there between. The sensing region 220 can include an overlay or other surface feature for interacting with the housing of the stylus. Beneath the sensor layer 250, the sensing region 220 includes a first substrate 260 and a routing layer 270. The first substrate 260 electrically insulates the sensor layer 250 from the routing layer 270. The routing layer 270 can include one or more conductive traces 272. Each of the traces 272 electrically connects to the sensor layer 250 with a corresponding via 262 that extends through the first substrate 260, as discussed further herein. The sensing region 220 can further include a second substrate 290 and a conductive shield layer 292. The shield layer 292 can include a metal (e.g., silver) or another conductive material. The second substrate 290 electrically insulates the routing layer 270 from the shield layer 292. The second substrate 290 can be coupled to the routing layer 270 with an adhesive layer 280. It will be recognized that additional layers can be provided while maintaining the functions of the sensing region 220 as described herein.

Figure 16:
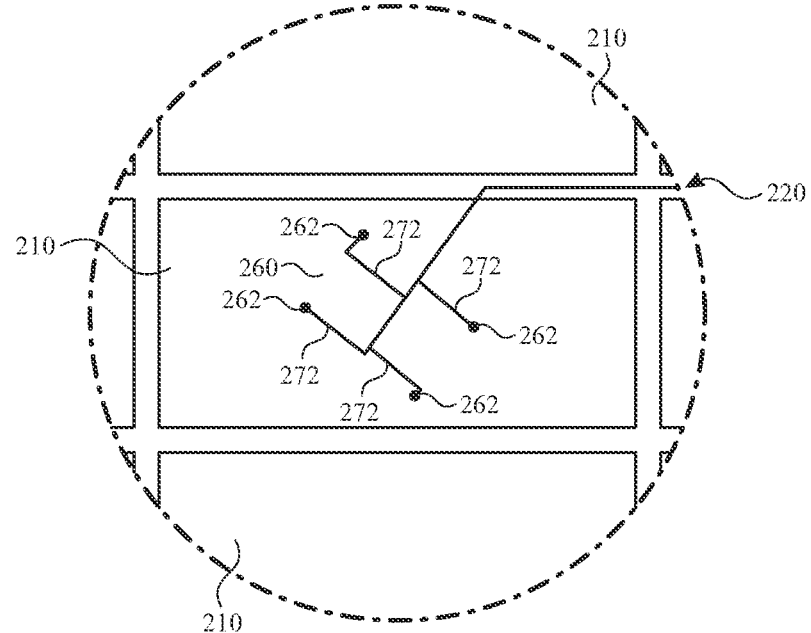
FIG. 16 illustrates a bottom view of a portion of the touch sensor of FIG. 14, according to some embodiments of the subject technology.

As shown in FIG. 16, for any given sensing element, the traces 272 of the sensing region 220 can provide multiple connections to vias 262 of the first substrate 260. For example, multiple traces 272 can branch from a single connector to extend to different locations along the first substrate 260. Each of the traces 272 can electrically connect to a via 262. For each sensing element, 1, 2, 3, 4, 5, 6, 7, 8, 9, 10, or more than 10 traces and vias can be provided. The vias 262 can be distributed at different locations along the first substrate 260. Each trace 272 can approach its corresponding via 262 in a different direction than a direction of at least one other trace 272. For example, as shown in FIG. 16, each of the four traces 272 extends in a different direction. The directions of the four traces 272 of FIG. 16 are, in some pairings, orthogonal to each other. It will be understood that other varieties of directions are possible.

The different orientations for the traces 272 provide redundant protection against incidental breakage of the connection to the vias 262. For example, during assembly of the stylus, the touch sensor 200 can be wrapped from a flat shape to a curved shape. The assembly process can apply stress and strain to the connections between the traces 272 and the vias 262. Where the strain is in particular directions, only some of the connections may be affected. Accordingly, incidental breakage of one connection due to stress during assembly can leave other connections intact. As long as one or more connections remain, the sensing element can maintain electrical connection to a controller through the intact trace and via connection(s).

Figure 17:
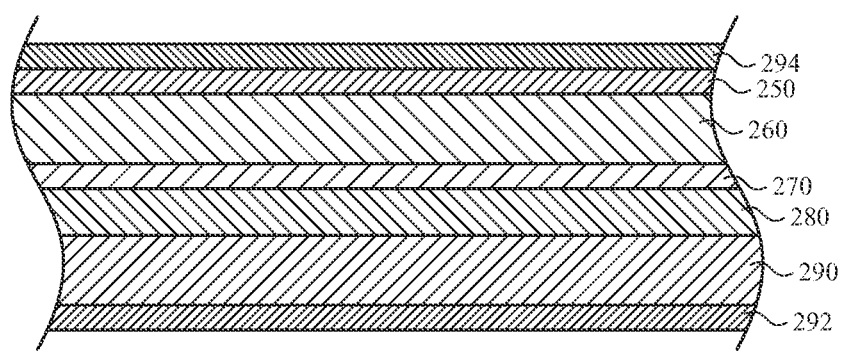
FIG. 17 illustrates a sectional view of the section D-D of the touch sensor of FIG. 14, according to some embodiments of the subject technology.

As shown in FIG. 17, the connector region 230 of the touch sensor can include at least some of the layers extending from the sensing region. For example, the sensor layer 250 can extend into the connector region 230. In addition, a second shield layer 294 can be provided over the sensor layer 250. The second shield layer 294 can include a metal (e.g., silver) or another conductive material. Beneath the sensor layer 250, the connector region 230 includes the first substrate 260, the routing layer 270, the adhesive layer 280, the second substrate 290, and the first shield layer 292.

Figure 18:
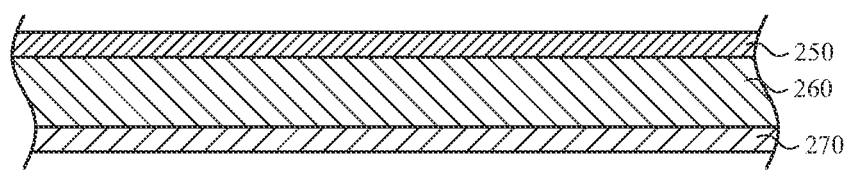
FIG. 18 illustrates a sectional view of the section E-E of the touch sensor of FIG. 14, according to some embodiments of the subject technology.

As shown in FIG. 18, the interface region 240 of the touch sensor can include at least some of the layers extending from the sensing region and the connector region. For example, the sensor layer 250 can extend into the interface region 240. Beneath the sensor layer 250, the interface region 240 includes the first substrate 260 and the routing layer 270. The interface region 240 can omit other layers beneath the routing layer 270, so that the components of the routing layer 270 are exposed, for example, to connect to an interface of the controller.

Figure 19:
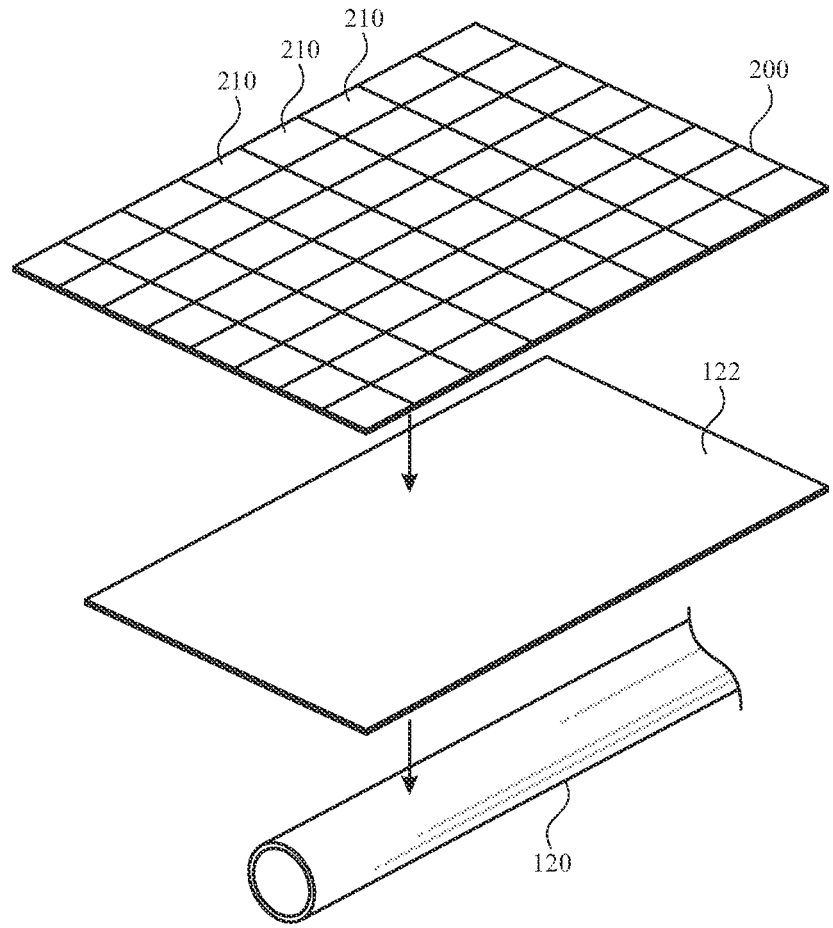
FIG. 19 illustrates a view of components of a stylus prior to assembly, according to some embodiments of the subject technology.
Figure 20:
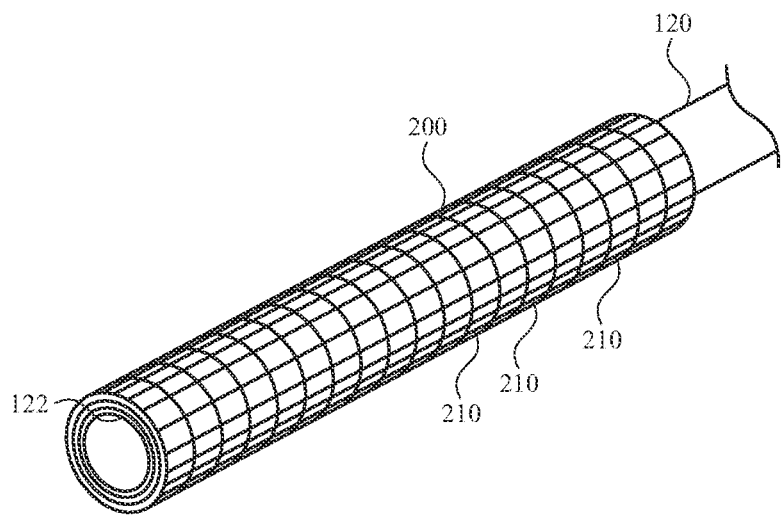
FIG. 20 illustrates a view of components of a stylus in a stage of assembly, according to some embodiments of the subject technology.

The stylus 100 can be assembled by a process that provides the touch sensor 200 at a grip region 104 of the stylus 100. As shown in FIG. 19, the touch sensor 200 and the elastic insert 122 can be provided in a flat or substantially planar configuration. As shown in FIG. 20, the elastic insert 122 can be wrapped around the support member 120, and the touch sensor 200 can be wrapped around the elastic insert 122.

Figure 21:
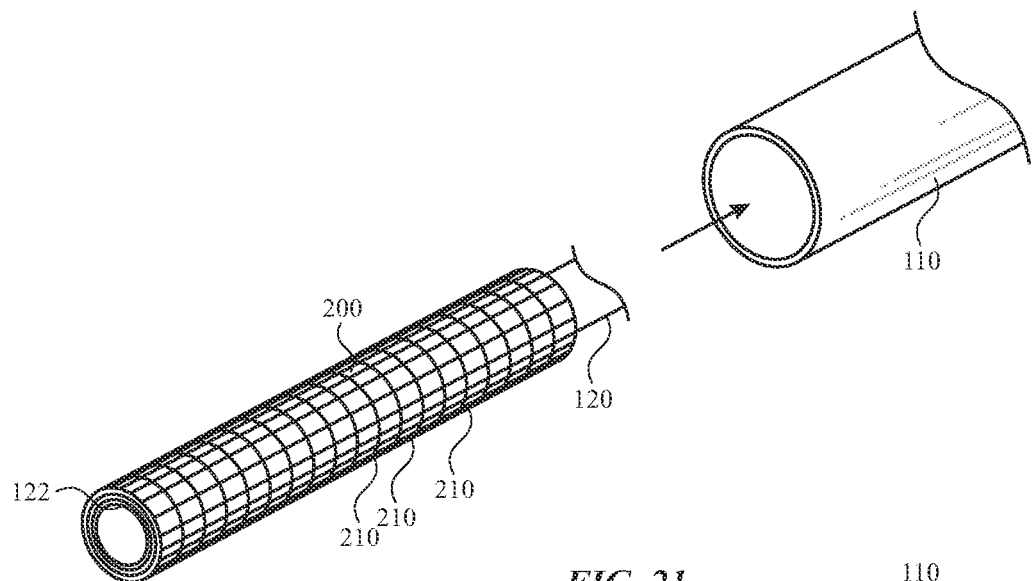
FIG. 21 illustrates a view of components of a stylus in another stage of assembly, according to some embodiments of the subject technology.

As shown in FIG. 21, the assembly including the support member 120, the elastic insert 122, and the touch sensor 200 can be inserted into the housing 110. Prior to being inserted, the assembly can be oversized such that an outer cross-sectional dimension (e.g. diameter) of the touch sensor 200 is greater than an inner cross-sectional dimension (e.g., diameter) of the housing 110. Accordingly, as the assembled touch sensor 200 is inserted into the housing, 110, it will be compressed to conform to the inner surface of the housing 110. The touch sensor 200 can compress along with the elastic insert 122 when inserted into the housing 110. While within the housing 110, the elastic insert 122, under compression, biases the touch sensor 200 against the inner surface of the housing. The elastic insert 122 can include one or more of a variety of materials to provide such biasing under compression. For example, the elastic insert 122 can include a foam structure, an elastomer, a matrix material, or another material having elastic properties. The elastic insert 122 can include an adhesive for bonding the touch sensor to the support member 120. For example, the elastic insert 122 can include a pressure-sensitive adhesive that is activated upon compression.

Figure 22:
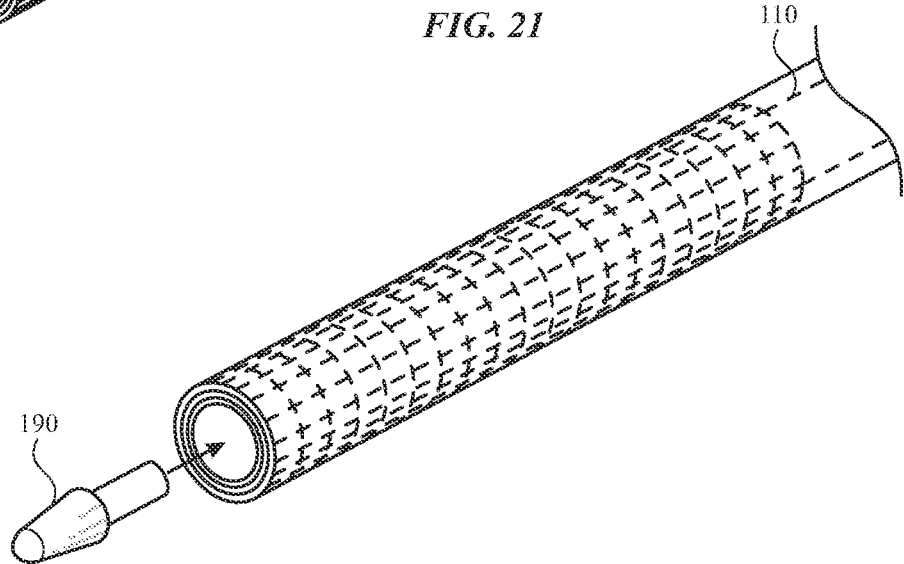
FIG. 22 illustrates a view of components of a stylus in another stage of assembly, according to some embodiments of the subject technology.

As shown in FIG. 22, the stylus can be assembled to include one or more other components. For example, the tip 190 can be provided at an end of the housing 110. At least a portion of the tip 190 can extend into the housing 110, for example within a space surrounded by the support member 120. Other components, such as a controller, can be assembled within the housing 110. The touch sensor 200 can be connected to the controller, for example with the interface region of the touch sensor 200.

Figure 23:
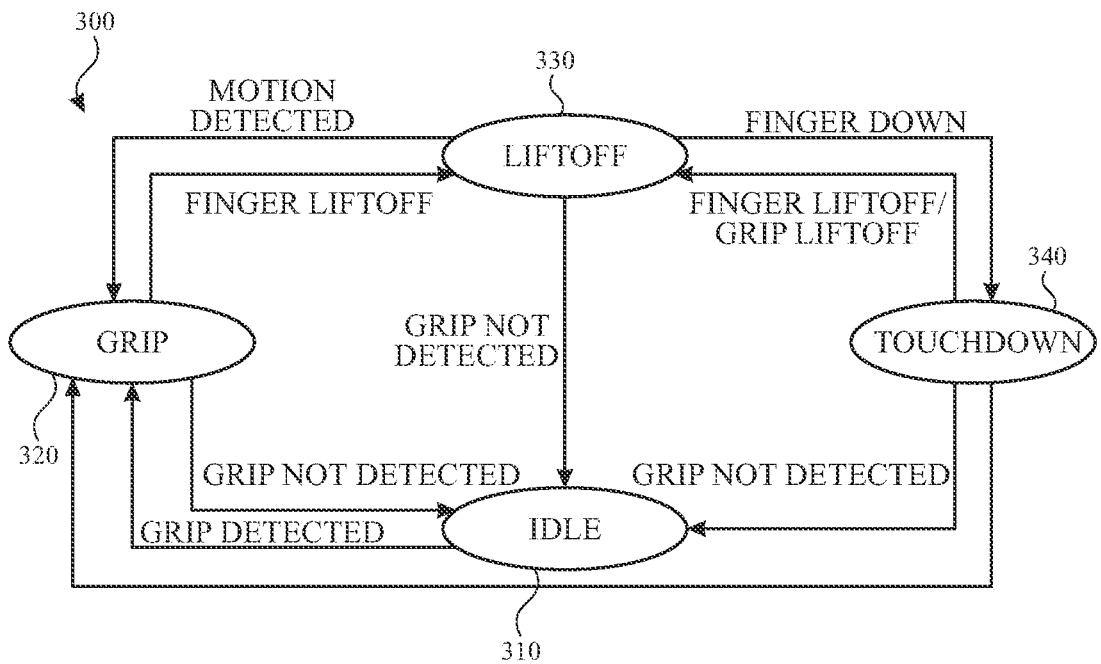
FIG. 23 illustrates a flow chart of modes for operating a stylus, according to some embodiments of the subject technology.

In use, the stylus can be operated in multiple modes to interpret user gestures as user inputs. Four modes are shown in FIG. 23: an idle mode 310, a grip mode 320, a liftoff mode 330, and a touchdown mode 340. Each mode, as well as transitions between modes, can correspond to functions that are applied to determine a user input. For example, particular sensed conditions in each mode can effect and change of mode and/or an output indicating that a user input has been received.

In the idle mode 310, the stylus can be determined to not be held or gripped by a user. Accordingly, certain sensed conditions can be filtered or rejected as user inputs. For example, the stylus can determine that none of the sensing elements are detecting an input based on the capacitance level detected at each of the sensing elements. Where none of the sensing elements detect a capacitance above a threshold, it can be determined that no fingers are touching the grip region. By further example, where particular sensing elements detect contact, it can nonetheless determined that the arrangement of activated sensing elements does not correspond to a profile representing a user grip. For example, where only the sensing elements on one side (e.g., along one longitudinal column) detect contact, it can be determined that the stylus is on a surface, rather than being held. Additionally or alternatively, other conditions can be used to apply the idle mode 310, such as movement of the stylus, orientation of the stylus, inputs at the tip, and/or user selections. For example, a lack of movement over a duration of time or an orientation on a horizontal surface can indicate that the stylus is at rest and not being held. The stylus can transition to the idle mode 310 from any other mode.

The stylus can transition from the idle mode 310 to the grip mode 320 upon detection that a user is holding the stylus. In the grip mode 320, the stylus can detect and interpret user inputs in the grip region. An arrangement and/or quantity of sensing elements that detect contact can indicate that the user is gripping the stylus at the grip region. Additionally or alternatively, other conditions can be used to apply the grip mode 320, such as movement of the stylus, orientation of the stylus, inputs at the tip, and/or user selections. For example, a sudden movement and/or an orientation corresponding to a user grip can indicate that the stylus is being picked up.

In the grip mode 320, the stylus can determine the number and/or position of fingers in the grip region. For example, multiple sensing elements can report detected capacitance. The number and/or location of these sensing elements can correspond to the number and/or location of the fingers applied to the grip region. While in grip mode 320, the stylus can initially and/or repeatedly set a first baseline representing, for example, the number of fingers on the grip region. Deviations from the first baseline, such as a decrease in capacitive counts, can indicate that the stylus is to change modes.

In the liftoff mode 330, the stylus determines that a user has lifted one or more fingers from the stylus. The stylus can enter the liftoff mode 330 based on a deviation from the first baseline. For example, while in the grip mode 320, the sensing elements can detect that the user is still gripping the stylus, but that a number of fingers applied has decreased. For example, where one fewer fingers is detected based on a decreased number of sensing elements detecting capacitance, the stylus can determine that a finger has lifted and enter liftoff mode 330. While in liftoff mode 330, the stylus can initially and/or repeatedly set a second baseline representing, for example, the new number of fingers on the grip region. Deviations from the second baseline, such as an increase in capacitive counts, can indicate that the stylus is to change modes.

In the touchdown mode 340, the stylus determines that a user has returned a finger to the stylus. The stylus can enter the touchdown mode 340 based on a deviation from the second baseline. For example, while in the liftoff mode 330, the sensing elements can detect that the user is still gripping the stylus and that a number of fingers applied has increased. For example, where one additional finger is detected based on an increased number of sensing elements detecting capacitance, the stylus can determine that a finger has returned to the grip region. The detected return of the finger can indicate that a tactile input from the user, such as a tap, is provided. Corresponding actions can be performed by the stylus and/or another device in communication with the stylus.

It will be recognize that any number of tactile inputs can be evaluated to determine whether an action should be performed. For example, multiple tactile inputs (e.g., taps), each of detectable duration and separated by detectable durations of time, can be evaluated in accordance with the disclosure provided herein. Different actions can be performed based on the variety of tactile inputs that can be received. For example, different actions can be associated with short-duration single tactile inputs, short-duration double tactile inputs, short-duration triple tactile inputs, long-duration single tactile inputs, and combinations thereof. One or more duration and/or gap thresholds can be applied to one or more tactile inputs, as described herein.

Thresholds described herein can be preprogrammed, user-selectable, user-adjustable, and/or automatically adjustable. One or more of the thresholds can be subject to a training session, in which the stylus and/or another device prompts the user to provide tactile inputs and/or observes tactile inputs provided by the user without prompting. The stylus and/or another device can determine whether inputs of a certain duration and are separated by a certain duration are intended by the user to be accepted by the stylus. For example, one or more actions associated with a tactile input can be manually canceled by a user when the stylus initiates the action. Based on a record of canceled actions, the stylus can determine which tactile inputs are intended and which are unintended. Thresholds and other parameters can be adjusted so that the stylus's responses to tactile inputs better represent the user's desired outcomes.

After a user input has been detected, the stylus can return to the grip mode 320, and accordingly set a new baseline. Additionally or alternatively, the stylus can return to the idle mode 310, as discussed herein.

Figure 24:
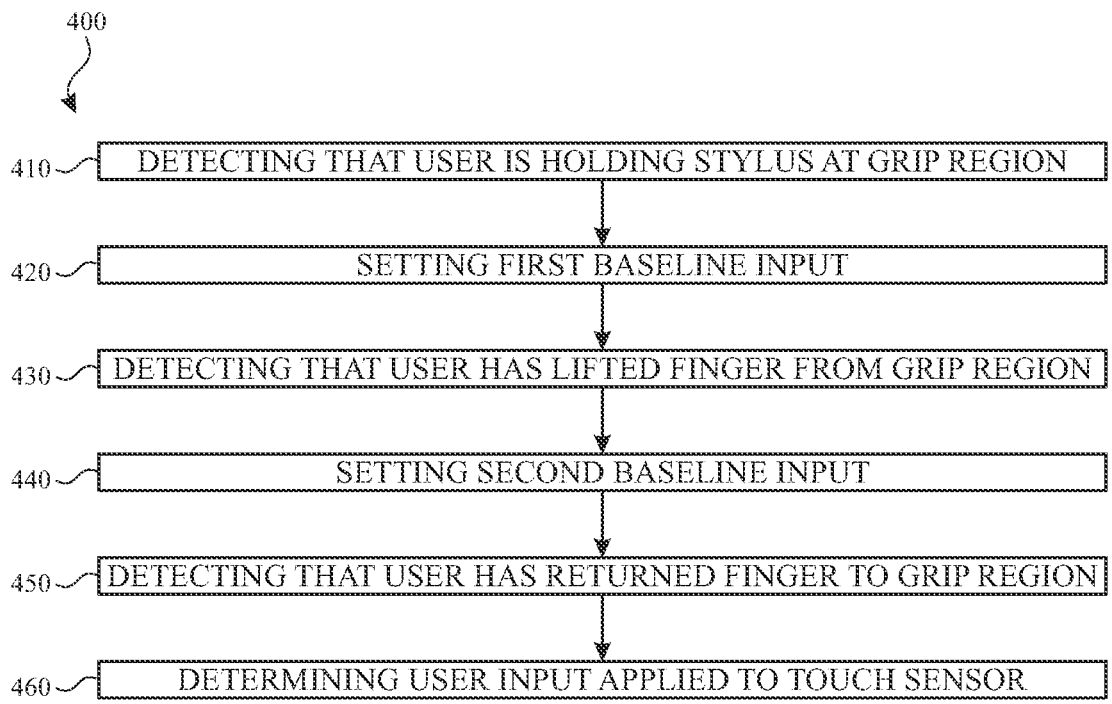
FIG. 24 illustrates a flow chart of a process for detecting a user input, according to some embodiments of the subject technology.

A method 400 can be employed to operate a touch sensor of a stylus. The method 400 can include operations relating to the modes described above with respect to FIG. 23. As such, the method 400 illustrated in FIG. 24 can be understood with reference to the modes and transitions illustrated in FIG. 23.

In operation 410, the stylus can detect, with the touch sensor at a grip region of the stylus, that a user is holding the stylus at the grip region. This detection can include entering the grip mode of the stylus. In operation 420, a first input baseline is set based on the detection that the user is holding the stylus. For example, the first input baseline can be set based on a number of sensing elements of the touch sensor that detect contact by fingers of the user while in the grip mode.

In operation 430, the stylus can detect, with the touch sensor, that the user has lifted a finger from the grip region based on a first deviation from the first input baseline. This detection can include entering the liftoff mode of the stylus. In operation 440, a second input baseline is set based on the detection that the user has lifted the finger. For example, the second input baseline can be set based on a number of sensing elements of the touch sensor that detect contact by fingers of the user while in the liftoff mode.

In operation 450, the stylus can detect, with the touch sensor, that the user has returned the finger to the grip region based on a second deviation from the second input baseline. This detection can include entering the touchdown mode of the stylus.

In operation 460, the stylus can determine, based on the first deviation and the second deviation, a user input applied to the touch sensor. An input signal can be transmitted from the stylus based on the user input and analysis thereof. The transmission can be performed, for example, by the communication component based on operation of the controller. The input signal can be transmitted to an external device and/or other components of the stylus. The input signal can include information relating to a characteristic of the user input. For example, the input signal can include a value that represents timing, quantity, duration, or other properties of the user input.

The stylus and/or an external device can be provided with instructions to perform certain actions upon receipt of the input signal. For example, an external device can interpret receipt of the input signal as a user selection. The subject of the user selection can be further indicated, for example, by contact of the stylus (e.g., the tip of the stylus) on a surface of the external device.

The stylus and/or the external device can provide confirmation upon receipt of a user input. For example, the stylus and/or the external device can provide haptic feedback to the user upon detection that a user input has been provided. By further example, a notification, alert, or alarm can be provided.

The external device can record receipt of the input signal and apply a corresponding action in response to subsequent inputs from the stylus. For example, the stylus can be used for drawing or writing by contacting the surface of the external device with the tip of the stylus. Such input can be recorded by the external device with markings, lines, or shapes having a variety of characteristics. For example, the recorded markings can have a certain shape, thickness, and color. When the user operates the touch sensor to create an input signal, the external device can interpret the input signal as a command to apply one or more characteristics to markings generated by subsequent input from the stylus. Accordingly, subsequent contact between the tip of the stylus and the surface of the external device can be recorded as markings having the one or more characteristics determined by the input signal. According to some embodiments, the input signal generated by operation of the touch sensor can toggle a setting that interprets subsequent inputs as either drawing new markings (e.g., drawing mode) or erasing existing markings (e.g., eraser mode). According to some embodiments, during receipt of an input signal generated by operation of the touch sensor, inputs from the tip of the stylus can be interpreted based on the input signal. For example, an input signal that corresponds to a property of a user input applied to the touch sensor can command the external device to interpret simultaneous inputs from the tip of the stylus with markings that have a characteristic based on the property of the user input. Drawing with the stylus during application of a user input above a threshold or within a higher range can result in thicker markings, and drawing with the stylus during application of a force below the threshold or within a lower range can result in thinner markings. Multiple ranges and thresholds can apply to the detected voltage to provide a range of possible input signals.

The characteristic of the user input can include a direction, pathway, speed, and/or length of a user motion gesture providing the user input. For example, a stylus can track a user motion gesture across multiple sensing elements and detect user inputs applied in sequence to each of the multiple sensing elements. The combined input can be used to detect a direction, pathway, speed, and/or length of the user motion gesture across the multiple sensing elements. The stylus or the external device can interpret the resulting input signal as a command to perform a function in accordance with the characteristic. According to some embodiments, the input signal can change a setting of the external device based on the input signal. For example, the external device can change volume, brightness, display zoom, marking characteristic, or other features of the external device to an extent that is proportionate to the characteristic (e.g., length) of the user motion gesture. For example, applying a user motion gesture in a first direction across the sensing elements can increase a setting value (e.g., volume, marking thickness, etc.) of the external device, and applying a user motion gesture across the sensing elements in a second direction, opposite the first direction, can decrease the setting value of the external device.

As discussed above, from any of the modes, the stylus can detecting that the user is not holding the stylus. Accordingly, the stylus can enter an idle mode of the stylus. While the stylus is in the idle mode, the stylus can reject detections by the touch sensor as user inputs.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the external device can be any device that interacts with a touch-based input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A stylus comprising:
   a housing defining a grip region of the stylus;
   a capacitive touch sensor comprising multiple sensing elements distributed circumferentially and longitudinally along an inner surface of the housing at the grip region; and
   a controller configured to operate the stylus in:
      a grip mode, when the controller detects at least a movement of the stylus, in which the controller, in response to at least the movement of the stylus, sets a first baseline and the multiple sensing elements are configured to detect when one of multiple fingers is not applied to the grip region based on a first deviation from the first baseline;
      a liftoff mode, when the controller determines with the capacitive touch sensor that a user is holding the grip region and in response to the first deviation from the first baseline, in which the controller sets a second baseline and the multiple sensing elements can detect when the one of the multiple fingers is returned to the grip region based on a second deviation from the second baseline, wherein the controller is further configured to return the stylus from the liftoff mode to the grip mode in response to at least the movement of the stylus;
      a touchdown mode, when the controller determines with the capacitive touch sensor that the user is holding the grip region and in response to the second deviation from the second baseline, in which the controller transmits an output to another device in response to a determination that a duration of time in which a sequence is detected is within a duration threshold, the sequence comprising the user holding the grip region with the multiple fingers, the first deviation from the first baseline, and the second deviation from the second baseline; and
      an idle mode, when the controller determines with the capacitive touch sensor that the stylus is not gripped by the user.

2. The stylus of claim 1, wherein the controller determines with the capacitive touch sensor that the stylus is not gripped by the user when the controller detects a lack of movement of the stylus over a duration of time.

3. The stylus of claim 1, wherein the controller determines with the capacitive touch sensor that the stylus is not gripped by the user when the controller detects an orientation of the stylus on a horizontal surface.

4. The stylus of claim 1, wherein the controller determines with the capacitive touch sensor that the stylus is not gripped by the user when only the multiple sensing elements on one side of the stylus detect contact.

5. The stylus of claim 1, wherein the first baseline represents a number of the multiple fingers on the grip region and the controller, while the stylus is in the grip mode, is further configured to detect the first deviation from the first baseline.

6. The stylus of claim 5, wherein the controller is configured to change from the grip mode to the liftoff mode when the first deviation from the first baseline is detected.

7. The stylus of claim 6, wherein the second baseline represents a number of the multiple fingers on the grip region and the controller, while the stylus is in the liftoff mode, is further configured to detect deviations from the second baseline.

8. The stylus of claim 7, wherein the controller is configured to change from the liftoff mode to the touchdown mode when the second deviation from the second baseline is detected.

9. The stylus of claim 1, wherein the first baseline and the second baseline each correspond to a number of the multiple sensing elements detecting capacitive counts.

10. The stylus of claim 1, wherein the controller is further configured to operate the stylus in the grip mode when the controller further detects, with the capacitive touch sensor, that the user is holding the grip region with multiple fingers.

11. A method of operating a touch sensor of a stylus, the method comprising:
   detecting, while in an idle mode of the stylus and with the touch sensor at a grip region of the stylus, that a user is holding the stylus with multiple fingers at the grip region;
   in response to detecting that the user is holding the stylus, applying a grip mode of the stylus and setting a first input baseline;
   detecting, while in the grip mode and with the touch sensor, that the user has lifted one of the multiple fingers from the grip region based on a first deviation from the first input baseline;
   in response to detecting that the user has lifted the one of the multiple fingers, applying a liftoff mode of the stylus and setting a second input baseline;
   detecting, while in the liftoff mode, a movement of the stylus;
   in response to detecting the movement, returning the stylus from the liftoff mode to the grip mode;
   detecting, while in the liftoff mode and with the touch sensor, that the user has returned the one of the multiple fingers to the grip region based on a second deviation from the second input baseline;
   detecting a duration of time in which a sequence of the user holding the grip region with the multiple fingers at the grip region, the user has lifted the one of the multiple fingers from the grip region, and the user has returned the one of the multiple fingers to the grip region is detected;
   comparing the duration of time to a duration threshold;
   determining whether the duration of time is within the duration threshold; and
   determining, when the duration of time is within the duration threshold and further based on the first deviation and the second deviation, a user input applied to the grip region.

12. The method of claim 11, wherein:
   setting the first input baseline is based on a number of sensing elements of the touch sensor that detect contact by the multiple fingers of the user while in the grip mode.

13. The method of claim 11, wherein:
   setting the second input baseline is based on a number of sensing elements of the touch sensor that detect contact by the multiple fingers of the user while in the liftoff mode.

14. The method of claim 11, wherein detecting that the user has returned the one of the multiple fingers to the grip region comprises entering a touchdown mode of the stylus.

15. The method of claim 11, wherein setting the first input baseline is further in response to detecting the movement.

16. A stylus comprising:
   a housing defining a grip region of the stylus;
   a motion sensor configured to detect a movement of the stylus; and
   a capacitive touch sensor extending continuously circumferentially and continuously longitudinally along an inner surface of the housing at the grip region, the capacitive touch sensor comprising multiple sensing elements;
   a controller configured to:
      in response to a detection of a grip of a user at the grip region, operate the stylus in a grip mode;
      in response to a detection of a liftoff of a finger from the grip region while the stylus is in the grip mode, operate the stylus in a liftoff mode;
      in response to a detection of the movement of the stylus, return the stylus from the liftoff mode to the grip mode;
      in response to a return of the finger to the grip region while the stylus is in the liftoff mode, operate the stylus in a touchdown mode, detect a duration of time separating the liftoff of the finger and the return of the finger, and compare the duration of time to a duration threshold, wherein the stylus is configured to perform an action in response to detections of the liftoff, the return, and the duration of time of time separating the liftoff of the finger and the return of the finger.

17. The stylus of claim 16, wherein the capacitive touch sensor is configured to detect movement of the finger along a longitudinal length of the grip region while the grip region is held by other fingers.

18. The stylus of claim 16, wherein the capacitive touch sensor is configured to detect movement of the finger about a circumference of the grip region while the grip region is held by other fingers.

19. The stylus of claim 16, wherein the capacitive touch sensor is a first capacitive touch sensor and the stylus further comprises:
   a tip moveable with respect to the housing; and
   a second capacitive touch sensor spaced apart from the first capacitive touch sensor, wherein the first capacitive touch sensor is between the tip and the second capacitive touch sensor.

* * * * *

UNITED STATES PATENT AND TRADEMARK OFFICE
CERTIFICATE OF CORRECTION

PATENT NO. : 11,989,358 B2
APPLICATION NO. : 17/729908
DATED : May 21, 2024
INVENTOR(S) : Blake R. Marshall et al.

It is certified that error appears in the above-identified patent and that said Letters Patent is hereby corrected as shown below:

In the Claims

Column 20, Line 36 Claim 16: "duration of time of time" should read --duration of time--.

Signed and Sealed this
Ninth Day of July, 2024

Katherine Kelly Vidal
*Director of the United States Patent and Trademark Office*